United States Patent
Kyselica

(10) Patent No.: US 11,993,334 B2
(45) Date of Patent: May 28, 2024

(54) OPTICAL DEVICE FOR A MOTORCYCLE HEADLAMP OPTICS

(71) Applicant: ZKW Group GmbH, Wieselburg (AT)

(72) Inventor: Jaroslav Kyselica, Deerice (SK)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/034,987

(22) PCT Filed: Oct. 29, 2021

(86) PCT No.: PCT/EP2021/080134
§ 371 (c)(1),
(2) Date: May 2, 2023

(87) PCT Pub. No.: WO2022/106179
PCT Pub. Date: May 27, 2022

(65) Prior Publication Data
US 2024/0017780 A1  Jan. 18, 2024

(30) Foreign Application Priority Data
Nov. 17, 2020 (EP) ................................. 20208077

(51) Int. Cl.
| | |
|---|---|
| *B62J 6/026* | (2020.01) |
| *F21S 41/24* | (2018.01) |
| *F21S 41/29* | (2018.01) |
| *F21W 107/17* | (2018.01) |

(52) U.S. Cl.
CPC ............... *B62J 6/026* (2020.02); *F21S 41/24* (2018.01); *F21S 41/29* (2018.01); *F21W 2107/17* (2018.01)

(58) Field of Classification Search
CPC .. B62J 6/026; F21S 41/29; F21S 41/24; F21S 43/237; F21S 43/27; F21S 41/285; F21S 41/143; F21W 2102/00; F21W 2107/10; F21Y 2115/00; G02B 6/0028; G02B 6/0068; G02B 6/0091
See application file for complete search history.

(56) References Cited

U.S. PATENT DOCUMENTS

| | | | |
|---|---|---|---|
| 2015/0124469 A1* | 5/2015 | Krenn ..................... | F21S 41/29 362/511 |
| 2018/0264994 A1 | 9/2018 | Stoehr et al. | |

(Continued)

FOREIGN PATENT DOCUMENTS

| | | | | |
|---|---|---|---|---|
| DE | 102012213843 B3 * | 9/2013 | ............ | F21S 41/143 |
| EP | 2884157 B1 * | 6/2017 | ............ | F21S 41/143 |

OTHER PUBLICATIONS

Search English translation of EP-2884157-B1 (Year: 2017).*
(Continued)

*Primary Examiner* — Omar Rojas Cadima
(74) *Attorney, Agent, or Firm* — Eversheds Sutherland (US) LLP

(57) ABSTRACT

An optical device (10) for a motorcycle headlamp, the optical device (10) comprising:
a primary optics (100) having a base body (110) and a plurality of light guiding elements (120) for forming a light distribution in a main direction (X), wherein each light guiding element (120) has a common light output surface (130) having an optically relevant area (131),
a holder (300),
a cover element (400), which is attachable to the holder (300), wherein the cover element (400) in combination with the holder (300) is configured to fix the position of the primary optics (100) between the holder (300) and the cover element (400), when the cover element (400) is attached to the holder (300), wherein the primary optics (100) comprises a stabilizing structure (200), wherein the stabilizing structure (200) is built as a protrusion projecting from the common light output surface (130) in the main direction (X), wherein the stabilizing structure (200) having a first support surface (210), and wherein the cover element (400) comprises a first counter-support surface (410), wherein the base (Continued)

Figure 1:
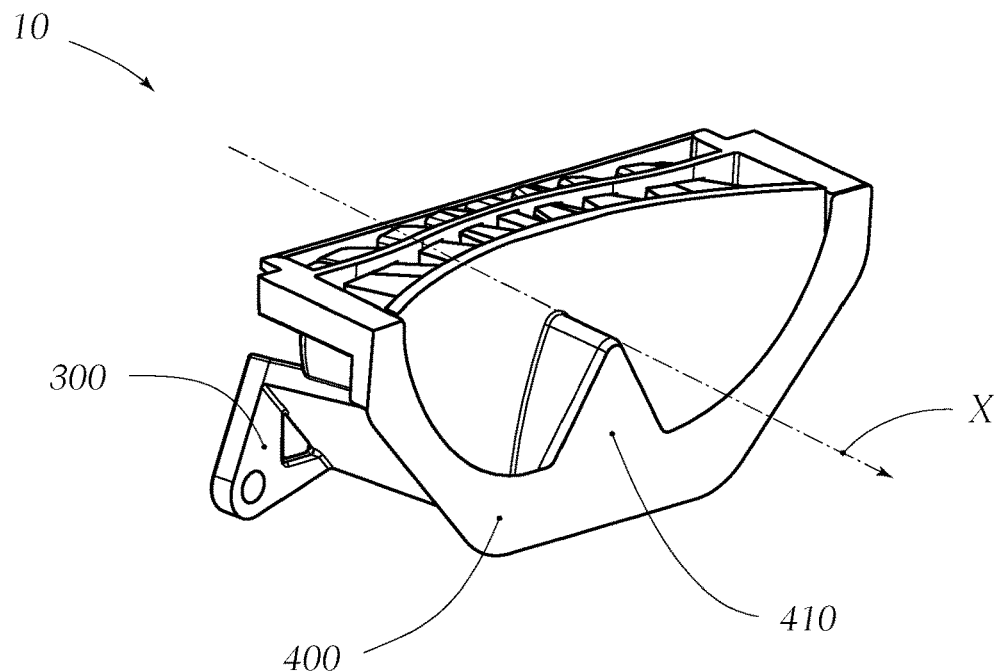

body (110) of the primary optics (100) comprises a second support surface (140), and wherein the holder (300) comprises a second counter-support surface, wherein the first counter-support surface (410) in combination with the first support surface (210) of the stabilizing structure (200) is configured to stabilize the position of the curved surface of the optically relevant area (131) of the common light output surface (130) of the primary optics (100) when the cover element (400) is attached to the holder (300).

17 Claims, 2 Drawing Sheets

(56) References Cited

U.S. PATENT DOCUMENTS

| | | | |
|---|---|---|---|
| 2019/0338930 A1 | 11/2019 | Spinger et al. | |
| 2020/0309342 A1* | 10/2020 | Monestier | F21S 41/24 |
| 2021/0231283 A1 | 7/2021 | Taudt et al. | |
| 2021/0310627 A1 | 10/2021 | Taudt et al. | |

OTHER PUBLICATIONS

Search English translation of DE-102012213843-B3 (Year: 2013).*
European Search Report for European Patent Application No. EP 20208077.6, dated Apr. 21, 2021 (9 Pages).
International Search Report and Written Opinion for International PCT/EP2021/080134, dated Feb. 22, 2022 (15 Pages).

\* cited by examiner

OPTICAL DEVICE FOR A MOTORCYCLE HEADLAMP OPTICS

The invention relates to an optical device for a motorcycle headlamp, the optical device comprising:
- a primary optics having a base body and a plurality of light guiding elements protruding from the base body for forming a predetermined light distribution from light of light sources in a main direction, wherein each light guiding element has a light input surface, into which light of the light sources can be coupled into the light guiding element, and a common light output surface having an optically relevant area, which is designed as a curved surface, and a peripheral area, which limits the optically relevant area of the common light output surface, wherein the curved surface of the optically relevant area is curved along at least two axes, which are orthogonal to the main direction,
- a holder, which is arranged on a backside of the primary optics, the light guiding elements of the primary optics passing through the holder through an opening area of the holder, which opening area is configured to receive the light guiding elements of the primary optics and to hold them in position regarding the light sources,
- a cover element, which is arranged on a front side of the primary optics facing away from the light guiding elements of the primary optics, wherein the cover element is attachable to the holder by means of at least one first engagement element arranged on the cover element, which first engagement element is configured to engage with the at least one second engagement element arranged on the holder, wherein the cover element in combination with the holder is configured to fix the position of the primary optics between the holder and the cover element, when the cover element is attached to the holder.

Further, the invention relates to a motorcycle headlamp with at least one optical device according to the invention.

Optical devices with state of the art primary optics are usually made of a silicone material and can therefore only have a limited size for a light output surface, as this would otherwise become unstable due to the material and would produce a shaky light distribution during a ride with the vehicle due to inevitably occurring vibrations.

It is an object of the invention to provide an enhanced optical device.

To achieve this object, the primary optics comprises a stabilizing structure, wherein the stabilizing structure is built as a protrusion projecting from the common light output surface in the main direction, wherein the stabilizing structure having a first support surface, and wherein the cover element comprises a first counter-support surface, which follows the form of the first support surface of the stabilizing structure, wherein the base body of the primary optics comprises a second support surface, which is arranged on the opposite side of the first support surface on the backside of the primary optics, and wherein the holder comprises a second counter-support surface, wherein the first counter-support surface in combination with the first support surface of the stabilizing structure is configured to stabilize the position of the curved surface of the optically relevant area of the common light output surface of the primary optics when the cover element is attached to the holder, wherein the cover element presses against the first support surface of the stabilizing structure and the second counter-support surface of the holder presses against the second support surface of the base body, when the cover element is attached to the holder.

Advantageously, the optical device comprises the light sources for emitting light into the light guiding elements.

Advantageously, the form of the support surface of the stabilizing structure is built as a triangle.

Advantageously, the stabilizing structure is built as a right triangular prism.

Advantageously, the stabilizing structure is built as a truncated pyramid structure.

Such shapes allow high stability of the stabilizing structure while keeping the volume of the stabilizing structure low, thus increasing the optically relevant area.

Advantageously, the light guiding elements are arranged in at least two areas on the base body, which areas are formed as circular sectors.

Advantageously, the holder is attachable to the base body of the primary optics by means of at least one third engagement element arranged on the holder, which third engagement element is configured to engage with at least one fourth engagement element arranged on the base body of the primary optics.

Advantageously, the fourth engagement element is arranged on a side of the base body, which faces away from the stabilizing structure.

Advantageously, the cover element is built as a burning glass shade configured to block sun radiation.

Advantageously, the primary optics are made of a silicone material.

Advantageously, the cover element comprises two branches which extend from the counter-support surface and substantially follow the peripheral area of the common light output surface of the primary optics, wherein the cover element presses against the peripheral area and the support surface when the cover element is attached to the holder.

This further stabilizes the optically relevant area, while maintaining the size of the optically relevant area.

Advantageously, the cover element having a cavity comprising the first counter-support surface, wherein the cavity corresponds to the stabilizing structure in a way, that the stabilizing structure is positively insertable into the cavity.

Advantageously, the cover element is built as a 3D molded cover element.

Advantageously, the cover element having a plate shape, which extends substantially in one plane, wherein preferably the plane is orthogonal to the main direction.

The object can also be achieved by a motorcycle headlamp with at least one optical device according to the invention.

Figure 2:
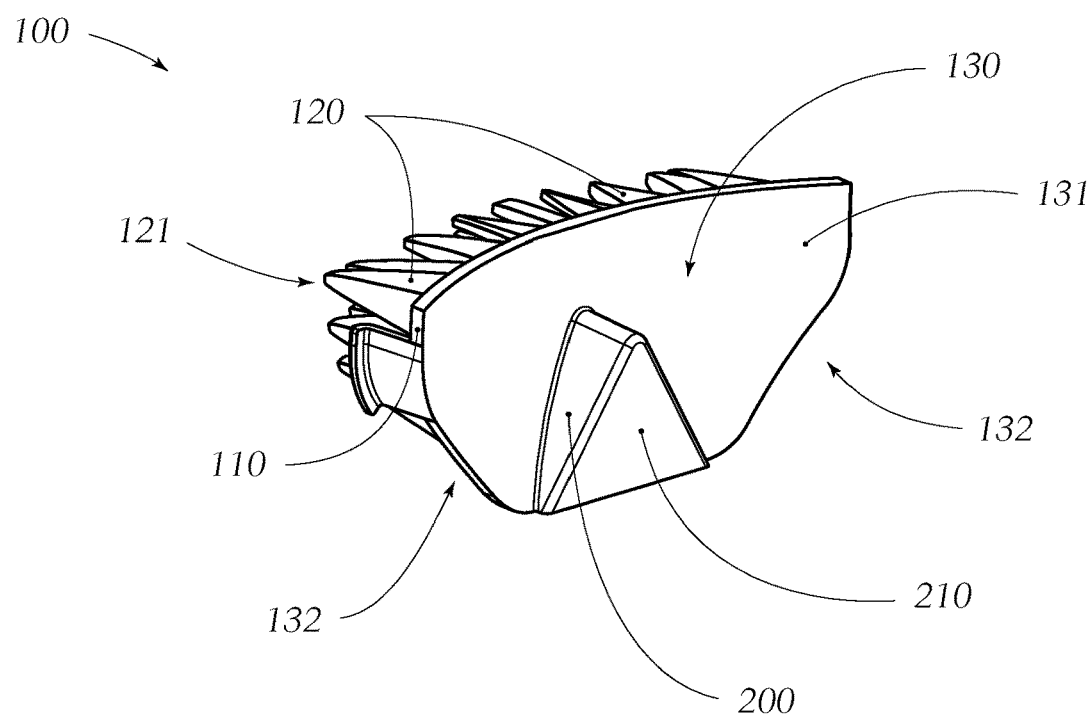
Figure 3:
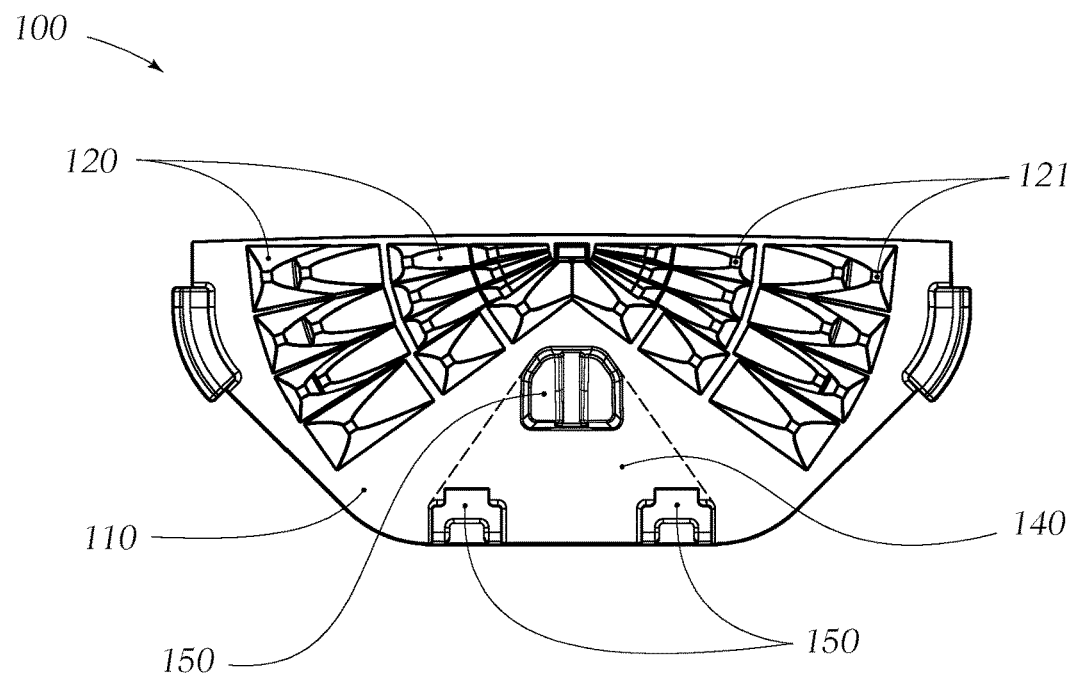
Figure 4:
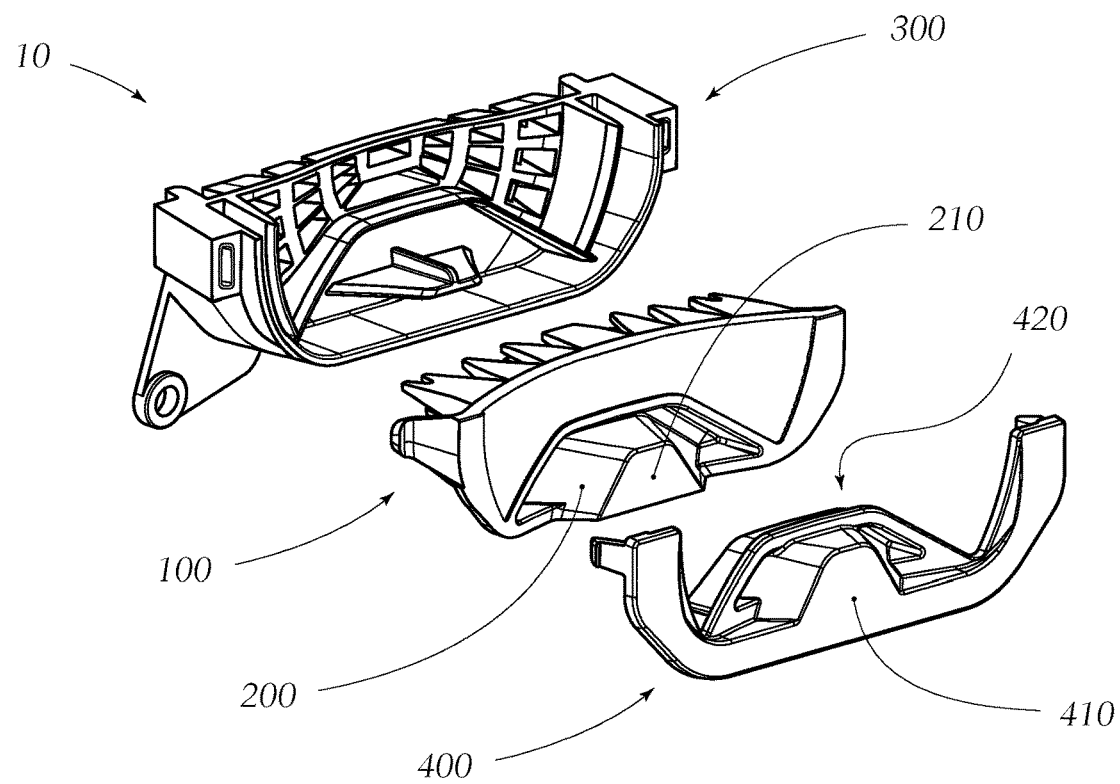

In the following, in order to further demonstrate the present invention, illustrative and non-restrictive embodiments are discussed, as shown in the drawings, which show:

FIG. 1 a perspective view of an illustrative optical device for a motorcycle headlamp with a primary optics, a holder and a cover element, FIG. 2 a perspective view of the illustrative primary optics of FIG. 1, FIG. 3 a back view of the primary optics of FIG. 2 in a main direction, and FIG. 4 a perspective view of a further illustrative optical device for a motorcycle headlamp, wherein the cover element having a cavity.

FIG. 1 shows an illustrative optical device 10 of a motorcycle headlamp, wherein the optical device 10 comprises a primary optics 100 having a base body 110 and a plurality of light guiding elements 120 protruding from the base body 110 for forming a predetermined light distribution from light of light sources in a main direction X, as can be seen in detail in FIG. 2. Further, the primary optics 100 is made of a silicone material via an injection molding process.

Each light guiding element 120 has a light input surface 121, into which light of the light sources can be coupled into the light guiding element 120, and a common light output surface 130 having an optically relevant area 131, which is designed as a curved surface, and a peripheral area 132, which limits the optically relevant area 131 of the common light output surface 130. The curved surface of the optically relevant area 131 is curved along at least two axes, which are orthogonal to the main direction X and orthogonal to each other.

The light guiding elements 120 are arranged in at least two areas on the base body 110, which areas are formed as circular sectors, as can be seen in FIG. 3.

The optical device 10 further comprises a holder 300, which is arranged on a backside of the primary optics 100, wherein the light guiding elements 120 of the primary optics 100 passing through the holder 300 through an opening area of the holder 300, which opening area is configured to receive the light guiding elements 120 of the primary optics 100 and to hold them in position regarding the light sources.

Further, the optical device 10 comprises a cover element 400, which is arranged on a front side of the primary optics 100 facing away from the light guiding elements 120 of the primary optics 100, wherein the cover element 400 is attachable to the holder 300 by means of the at least one first engagement element arranged on the cover element 400, which first engagement element is configured to engage with the at least one second engagement element arranged on the holder 300, wherein the cover element 400 in combination with the holder 300 is configured to fix the position of the primary optics 100 between the holder 300 and the cover element 400, when the cover element 400 is attached to the holder 300.

As can be seen in FIG. 2, the primary optics 100 comprises a stabilizing structure 200, wherein the stabilizing structure 200 is built as a protrusion projecting from the common light output surface 130 in the main direction X, wherein the stabilizing structure 200 having a first support surface 210 and is built as a right triangular prism, wherein the form of the support surface 210 of the stabilizing structure 200 is built as a triangle.

The cover element 400 comprises a first counter-support surface 410—as can be seen in FIG. 1—which follows the form of the first support surface 210 of the stabilizing structure 200.

The base body 110 of the primary optics 100 comprises a second support surface 140, which is arranged on the opposite side of the first support surface 210 on the backside of the primary optics 100, as can be seen in FIG. 3, wherein the holder 300 comprises a second counter-support surface, wherein the first counter-support surface 410 in combination with the first support surface 210 of the stabilizing structure 200 is configured to stabilize the position of the curved surface of the optically relevant area 131 of the common light output surface 130 of the primary optics 100 when the cover element 400 is attached to the holder 300.

In an assembled state of the optical device 10 the cover element 400 presses against the first support surface 210 of the stabilizing structure 200 and the second counter-support surface of the holder 300 presses against the second support surface 140 of the base body 110, when the cover element 400 is attached to the holder 300.

Thereby, the cover element 400 comprises two branches which extend from the counter-support surface 410 and substantially follow the peripheral area 132 of the common light output surface 130 of the primary optics 100, wherein the cover element 400 presses against the peripheral area 132 and the support surface 210 when the cover element 400 is attached to the holder 300.

Moreover, the cover element 400 is built as a burning glass shade configured to block sun radiation, e.g. sun radiation focused by a projection lens, so that the primary optics 100 is not heated up and retains its optical properties.

Moreover, the cover element 400 having a plate shape, which extends substantially in one plane, wherein the plane is orthogonal to the main direction X.

In detail, the holder 300 is attachable to the base body 110 of the primary optics 100 by means of three third engagement elements arranged on the holder 300, which third engagement elements are configured to engage with three fourth engagement elements 150 arranged on the base body 110 of the primary optics 100, which can be seen in FIG. 3.

The fourth engagement elements 150 are arranged on a side of the base body 110, which face away from the stabilizing structure 200, each are arranged in a corner of the triangle form of the stabilizing structure 200 on the backside of the primary optics 100 seen in the main direction X.

FIG. 4 shows another illustrative optical device 10 with a holder 300, primary optics 100 with a stabilizing structure 200 comprising a first support surface 210 and a cover element 400. It should be noticed, that the previously said to the embodiment in the forgoing figures is equally applicable to the embodiment in FIG. 4.

The cover element 400 having a cavity 420 comprising the first counter-support surface 410, wherein the cavity 420 corresponds to the stabilizing structure 200, which is built as a truncated pyramid structure in the shown example, in a way, that the stabilizing structure 200 is positively insertable into the cavity 420. The cover element 400 in this example is built as a 3D molded cover element.

LIST OF REFERENCE SIGNS

Optical device . . . 10
Primary optics . . . 100
Base body . . . 110
Light guiding elements . . . 120
Light input surface . . . 121
Common light output surface . . . 130
Optically relevant area . . . 131
Peripheral area . . . 132
Second support surface . . . 140
Fourth engagement element . . . 150
Stabilizing structure . . . 200
First support surface . . . 210
Holder . . . 300
Cover element . . . 400
First counter-support surface . . . 410
Cavity . . . 420
Main direction . . . X

The invention claimed is:

1. An optical device (10) for a motorcycle headlamp, the optical device (10) comprising:
a primary optics (100) having a base body (110) and a plurality of light guiding elements (120) protruding from the base body (110) for forming a predetermined light distribution from light of light sources in a main direction (X), wherein each light guiding element (120) has a light input surface (121), into which light of the light sources can be coupled into the light guiding element (120), and a common light output surface (130) having an optically relevant area (131), which is designed as a curved surface, and a peripheral area (132), which limits the optically relevant area (131) of the common light output surface (130), wherein the curved surface of the optically relevant area (131) is curved along at least two axes, wherein the two axes are orthogonal to the main direction (X), and wherein the two axes are orthogonal to each other;

a holder (300), which is arranged on a backside of the primary optics (100), the light guiding elements (120) of the primary optics (100) passing through the holder (300) through an opening area of the holder (300), which opening area is configured to receive the light guiding elements (120) of the primary optics (100) and to hold them in position regarding the light sources; and a cover element (400), which is arranged on a front side of the primary optics (100) facing away from the light guiding elements (120) of the primary optics (100), wherein the cover element (400) is attachable to the holder (300) by means of at least one first engagement element arranged on the cover element (400), which first engagement element is configured to engage with at least one second engagement element arranged on the holder (300), wherein the cover element (400) in combination with the holder (300) is configured to fix the position of the primary optics (100) between the holder (300) and the cover element (400), when the cover element (400) is attached to the holder (300), wherein the primary optics (100) comprises a stabilizing structure (200), wherein the stabilizing structure (200) is built as a protrusion projecting from the common light output surface (130) in the main direction (X), wherein the stabilizing structure (200) has a first support surface (210), and wherein the common light output surface (130) at least partially surrounds the stabilizing structure (200), wherein the cover element (400) comprises a first counter-support surface (410), which follows the form of the first support surface (210) of the stabilizing structure (200), wherein the base body (110) of the primary optics (100) comprises a second support surface (140), which is arranged on the opposite side of the first support surface (210) on the backside of the primary optics (100), and wherein the holder (300) comprises a second counter-support surface, wherein the first counter-support surface (410) in combination with the first support surface (210) of the stabilizing structure (200) is configured to stabilize the position of the curved surface of the optically relevant area (131) of the common light output surface (130) of the primary optics (100) when the cover element (400) is attached to the holder (300), and wherein the cover element (400) presses against the first support surface (210) of the stabilizing structure (200) and the second counter-support surface of the holder (300) presses against the second support surface (140) of the base body (110), when the cover element (400) is attached to the holder (300).

2. The optical device according to claim 1, wherein the first support surface (210) of the stabilizing structure (200) is built as a triangle.

3. The optical device according to claim 1, wherein the stabilizing structure (200) is built as a right triangular prism.

4. The optical device according to claim 1, wherein the plurality of light guiding elements (120) are arranged in at least two areas on the base body (110), which areas are formed as circular sectors.

5. The optical device according to claim 1, wherein the holder (300) is attachable to the base body (110) of the primary optics (100) by means of at least one third engagement element arranged on the holder (300), which third engagement element is configured to engage with at least one fourth engagement element (150) arranged on the base body (110) of the primary optics (100).

6. The optical device according to claim 5, wherein the at least one fourth engagement element (150) is arranged on a side of the base body (110), which faces away from the stabilizing structure (200).

7. The optical device according to claim 1, wherein the cover element (400) is built as a burning glass shade configured to block sun radiation.

8. The optical device according to claim 1, wherein the primary optics (100) are made of a silicone material.

9. The optical device according to claim 1, wherein the cover element (400) comprises two branches which extend from at least one of the first or second counter-support surfaces (410) and substantially follow the peripheral area (132) of the common light output surface (130) of the primary optics (100), wherein the cover element (400) presses against the peripheral area (132) and at least one of the first or second support surfaces (210) when the cover element (400) is attached to the holder (300).

10. The optical device according to claim 1, wherein the stabilizing structure is built as a truncated pyramid structure.

11. The optical device according to claim 1, wherein the cover element (400) having a cavity (420) comprising the first counter-support surface (410), wherein the stabilizing structure (200) is positively insertable in the cavity (420).

12. The optical device according to claim 11, wherein the cover element (400) is built as a 3D molded cover element.

13. The optical device according to claim 1, wherein the cover element (400) has a plate shape, which extends substantially in one plane.

14. A motorcycle headlamp with at least one optical device (10) according to claim 1.

15. The optical device according to claim 13, wherein the one plane is orthogonal to the main direction (X).

16. The optical device according to claim 1, wherein the first support surface (210) is parallel with the second support surface (140) and the first counter-support surface (410).

17. An optical device (10) for a motorcycle headlamp, the optical device (10) comprising:

a primary optics (100) made of a silicon material and having a base body (110) and a plurality of light guiding elements (120) protruding from the base body (110) for forming a predetermined light distribution from light of light sources in a main direction (X), wherein each light guiding element (120) has a light input surface (121), into which light of the light sources can be coupled into the light guiding element (120), and a common light output surface (130) having an optically relevant area (131), which is designed as a curved surface, and a peripheral area (132), which limits the optically relevant area (131) of the common light output surface (130), wherein the curved surface of the optically relevant area (131) is curved along at least two axes, wherein the two axes are orthogonal to the main direction (X), and wherein the two axes are orthogonal to each other;

a holder (300), which is arranged on a backside of the primary optics (100), the light guiding elements (120) of the primary optics (100) passing through the holder (300) through an opening area of the holder (300), which opening area is configured to receive the light guiding elements (120) of the primary optics (100) and to hold them in position regarding the light sources; and a cover element (400), which is arranged on a front side of the primary optics (100) facing away from the light guiding elements (120) of the primary optics (100), wherein the cover element (400) is attachable to the holder (300) by means of at least one first engagement element arranged on the cover element (400), which first engagement element is configured to engage with at least one second engagement element arranged on the holder (300), wherein the cover element (400) in combination with the holder (300) is configured to fix the position of the primary optics (100) between the holder (300) and the cover element (400), when the cover element (400) is attached to the holder (300), wherein the primary optics (100) comprises a stabilizing structure (200), wherein the stabilizing structure (200) is built as a protrusion projecting from the common light output surface (130) in the main direction (X), wherein the stabilizing structure (200) has a first support surface (210), and wherein the common light output surface (130) at least partially surrounds the stabilizing structure (200), wherein the cover element (400) comprises a first counter-support surface (410), which follows the form of the first support surface (210) of the stabilizing structure (200), wherein the base body (110) of the primary optics (100) comprises a second support surface (140), which is arranged on the opposite side of the first support surface (210) on the backside of the primary optics (100), and wherein the holder (300) comprises a second counter-support surface, wherein the first counter-support surface (410) in combination with the first support surface (210) of the stabilizing structure (200) is configured to stabilize the position of the curved surface of the optically relevant area (131) of the common light output surface (130) of the primary optics (100) when the cover element (400) is attached to the holder (300), and wherein the cover element (400) presses against the first support surface (210) of the stabilizing structure (200) and the second counter-support surface of the holder (300) presses against the second support surface (140) of the base body (110), when the cover element (400) is attached to the holder (300).

\* \* \* \* \*